(12) United States Patent
Nakagawa et al.

(10) Patent No.: US 11,956,391 B2
(45) Date of Patent: Apr. 9, 2024

(54) IMAGE READING APPARATUS AND IMAGE FORMING SYSTEM TO DRIVE BACKING ROLLERS RELATIVE TO OUTLET CONVEYANCE ROLLERS

(71) Applicant: CANON KABUSHIKI KAISHA, Tokyo (JP)

(72) Inventors: Tomohito Nakagawa, Chiba (JP); Yukihiro Soeta, Kanagawa (JP); Teppei Nagata, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/056,196

(22) Filed: Nov. 16, 2022

(65) Prior Publication Data

US 2023/0164277 A1 May 25, 2023

(30) Foreign Application Priority Data

Nov. 24, 2021 (JP) ................................ 2021-190495

(51) Int. Cl.
*H04N 1/00* (2006.01)
*H04N 1/12* (2006.01)

(52) U.S. Cl.
CPC .......... *H04N 1/0057* (2013.01); *H04N 1/121* (2013.01)

(58) Field of Classification Search
USPC ........................................................ 358/1.5
See application file for complete search history.

(56) References Cited

U.S. PATENT DOCUMENTS

| 2002/0080427 A1* | 6/2002 | Clifton | H04N 1/1013 358/504 |
| 2016/0360057 A1* | 12/2016 | Ogasawara | H04N 1/00909 |
| 2018/0198943 A1* | 7/2018 | Yoshikaie | H04N 1/047 |
| 2018/0335740 A1* | 11/2018 | Kishi | G03G 15/0415 |
| 2022/0345578 A1* | 10/2022 | Nakagawa | H04N 1/00615 |

FOREIGN PATENT DOCUMENTS

JP 2021125802 A 8/2021

* cited by examiner

*Primary Examiner* — Jacky X Zheng
(74) *Attorney, Agent, or Firm* — Canon U.S.A., Inc. I.P. Division

(57) ABSTRACT

An image reading apparatus includes first and second first conveyance rollers, transparent members, reading units, and opposing rollers, and includes a driving unit. The first reading unit reads an image on a sheet first surface through the first transparent member at a first reading position. The first opposing roller is opposed to the first transparent member at the first reading position. The second reading unit reads an image on a sheet second surface through the second transparent member at a second reading position. The second opposing roller is opposed to the second transparent member at the second reading position. The second conveyance roller is arranged where a sheet trailing edge passes through the first reading position while the second conveyance roller conveys the sheet. The driving unit drives the first opposing roller so that a first opposing roller circumferential speed is faster than a second conveyance roller circumferential speed.

15 Claims, 10 Drawing Sheets

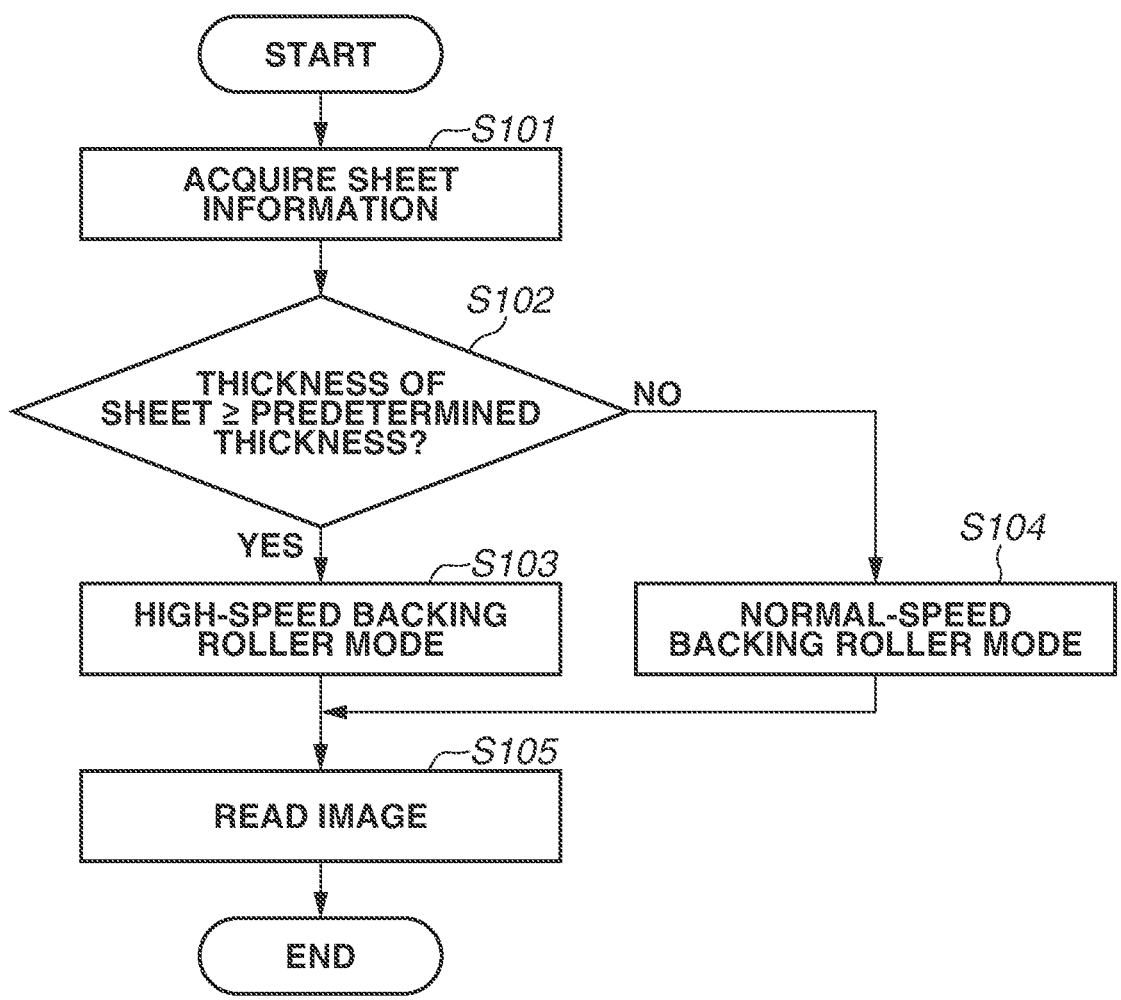

IMAGE READING APPARATUS AND IMAGE FORMING SYSTEM TO DRIVE BACKING ROLLERS RELATIVE TO OUTLET CONVEYANCE ROLLERS

BACKGROUND

Field

The present disclosure relates to an image reading apparatus that reads an image on a sheet and an image forming system including the same.

Description of the Related Art

There are known image forming systems equipped with an image reading apparatus that reads an image on a sheet formed by the image forming unit. In some image reading apparatuses used in the above-described image forming systems, the reading unit reads an image on a sheet through a transparent member that forms a conveyance path along which the sheet is conveyed. Japanese Patent Application Laid-Open No. 2021-125802 discusses an image reading apparatus in which a reading unit that reads the image on the top side of a sheet is arranged downstream of another reading unit that reads the image on the back side of the sheet to read the images on both sides of the sheet received from the image forming unit. Further, the image reading apparatus discussed in Japanese Patent Application Laid-Open No. 2021-125802 includes an opposing roller for stabilizing the distance between a sheet and a reading unit at the reading position arranged opposed to the transparent member of the conveyance path. The opposing roller is arranged at a position opposed to the reading unit on either side and is rotatable by a driving mechanism.

However, when the trailing edge of a sheet exits from the opposing roller opposed to the reading unit upstream, the speed of the sheet sometimes temporarily varies. Such varying conveyance speed of a sheet can create partial expansion or reduction of the read image, resulting in a reading failure.

SUMMARY

The present disclosure is directed to reduction of reading failures of images on sheets in an image reading apparatus that reads images on the sheets formed by the image forming unit.

According to an aspect of the present disclosure, an image reading apparatus includes a first conveyance roller configured to convey a sheet along a conveyance path, a first transparent member configured to be arranged on the conveyance path and to be opposed to a first surface of the sheet conveyed by the first conveyance roller, a first reading unit configured to read an image on the first surface of the sheet through the first transparent member at a first reading position, a first opposing roller configured to be rotatable, to be opposed to the first transparent member at the first reading position, and to be opposed to a second surface opposite to the first surface of the sheet, a driving unit configured to drive the first opposing roller, a second transparent member configured to be arranged on the conveyance path and to be opposed to the second surface of the sheet conveyed by the first conveyance roller, a second reading unit configured to read an image on the second surface of the sheet through the second transparent member at a second reading position downstream of the first reading position in a conveyance direction of the first conveyance roller, a second opposing roller configured to be rotatable, to be opposed to the second transparent member at the second reading position, and to be opposed to the first surface of the sheet, and a second conveyance roller configured to convey the sheet when the second reading unit reads the image on the sheet, wherein the second conveyance roller is arranged at a position where a trailing edge of the sheet passes through the first reading position while the second conveyance roller is conveying the sheet, wherein the driving unit drives the first opposing roller so that a circumferential speed of the first opposing roller is faster than a circumferential speed of the second conveyance roller.

Further features of the present disclosure will become apparent from the following description of exemplary embodiments with reference to the attached drawings.

BRIEF DESCRIPTION OF THE DRAWINGS

FIG. 10 is a flowchart illustrating control of the image forming system.

DESCRIPTION OF THE EMBODIMENTS

Exemplary embodiments for implementing the present disclosure will be described in detail below with reference to the attached drawings. However, components described in the following exemplary embodiments can be appropriately modified in dimension, material, shape, and relative position with configurations and various conditions of an apparatus to which the present disclosure is applied, and are not intended to limit the scope of the present disclosure.

[Configuration of Image Forming Apparatus]

Figure 1:
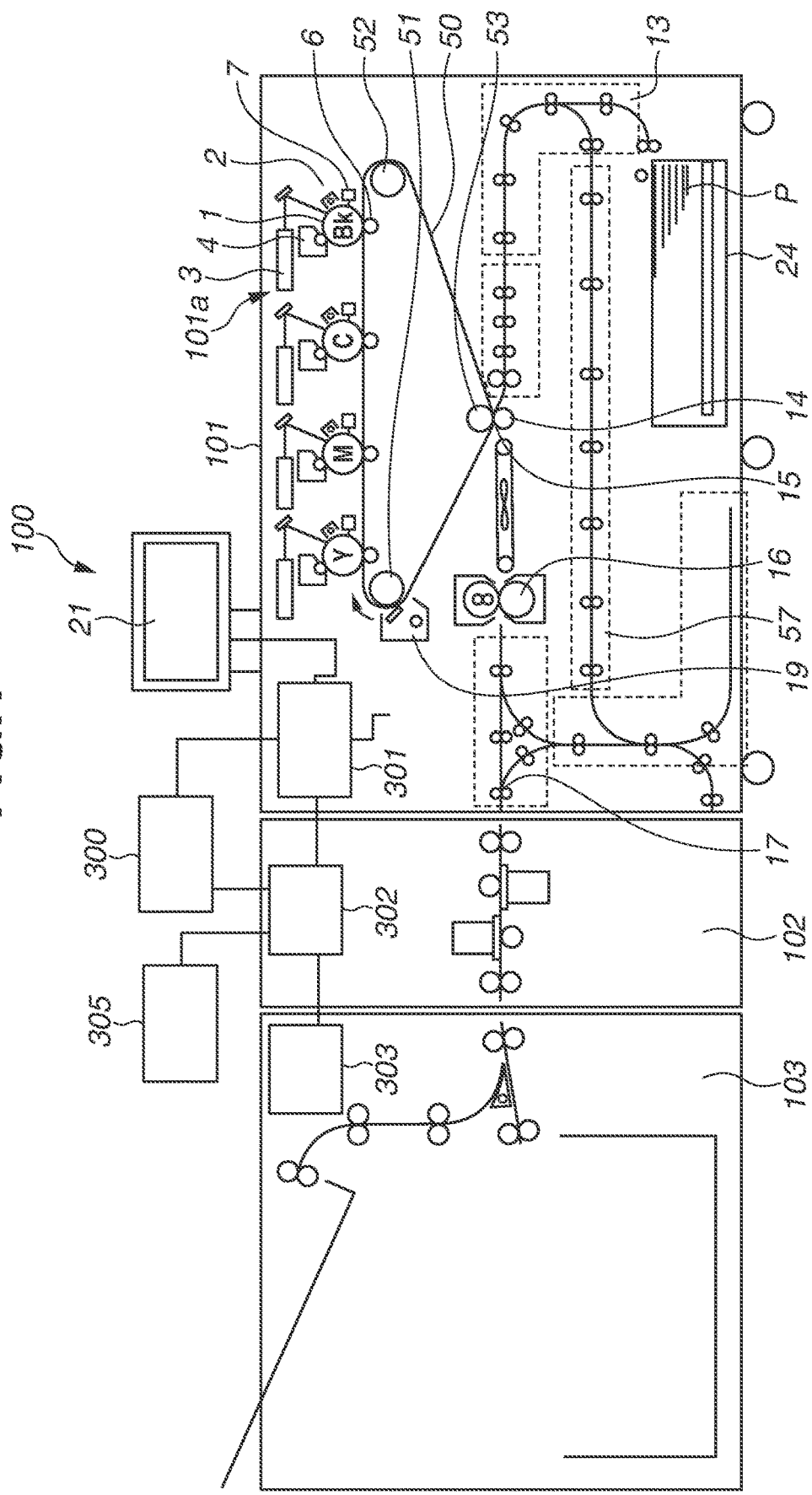
FIG. 1 is the overall view of an image forming system.

FIG. 1 is the overall view of an image forming system 100 according to the present exemplary embodiment. The image forming system 100 is a system in which a printer 101, an image reading apparatus 102, and a stacking apparatus 103 are connected. The image forming system 100 includes an operation unit 21 for users to perform various inputs to the image forming system 100.

The printer 101, which is an image forming apparatus, is a full color printer using an electrophotographic process with four colors. The printer 101 forms a toner image on a recording material based on an image signal input to a control unit 301 from an information terminal such as a personal computer (PC) or an external apparatus 300 such as an image reader. The recording material is a recording medium (hereinafter, referred to as a sheet P) on which a toner image can be formed, and plain paper, thick paper, super-thick paper, an overhead projector (OHP) sheet, coated paper, label paper, and other types of paper can be used as the recording material.

The printer 101 includes four image forming mechanism units 101a as image forming units that each form a toner image in the corresponding color among yellow (Y), magenta (M), cyan (C), and black (Bk). The image forming mechanism units 101a form toner images using the conventionally known electrophotographic process. These four image forming mechanism units 101a are arranged in parallel from left to right in FIG. 1.

A laser scanner unit 3, which is an exposure apparatus, is arranged above each image forming mechanism unit 101a, and an intermediate transfer belt 50 is arranged below the image forming mechanism units 101a. The intermediate transfer belt 50 is stretched around a driving roller 51, a tension roller 52, and an inner secondary transfer roller 53, and is driven in the direction of an arrow in FIG. 1.

Each of the image forming mechanism units 101a has a similar electrophotographic process configuration and differs only in the color of toner (developer) to be used. Each image forming mechanism unit 101a includes a photosensitive drum 1 as an image bearing member, a charger 2, a development unit 4, a primary transfer roller 6, and a drum cleaner 7. In FIG. 1, the reference numerals of the image forming mechanism units 101a other than the image forming mechanism unit 101a for black (Bk) are omitted to avoid complication of the drawing.

The toner image in each color is primarily transferred from the photosensitive drum 1 of the image forming mechanism unit 101a to the intermediate transfer belt 50 to be superimposed one by one. This process forms an unfixed full-color toner image with the four color toners of Y, M, C, and Bk superimposed on the intermediate transfer belt 50.

The printer 101 includes a cassette 24 in which the sheet P is stored. The sheet P fed from the cassette 24 passes through a conveyance path 13 and is conveyed into a secondary transfer nip portion 15, which is a pressure contact portion between the intermediate transfer belt 50 and a secondary transfer roller 14, at a predetermined control timing. Then, the superimposed four-color toner image on the intermediate transfer belt 50 is secondarily transferred onto the sheet P. Then, the residual toner remaining on the intermediate transfer belt 50 after the secondary transfer to the sheet P is removed from the surface of the intermediate transfer belt 50 by a belt cleaner 19.

Then, the sheet P with the toner image transferred thereon is conveyed into a fixing device 16 and is subjected to fixing processing of heating and pressing. After passing through the fixing device 16, the sheet P is discharged from the printer 101 by a discharging roller pair 17 and is conveyed to the image reading apparatus 102. In duplex printing, the sheet P with an image formed on one surface passes through a reverse conveyance path 57 and is conveyed again to the secondary transfer nip portion 15.

Each image forming unit of the printer 101 according to the present exemplary embodiment has a configuration using the electrophotographic process, but may have a configuration using another image forming system such as an ink-jet system.

[Configuration of Image Reading Apparatus]

Figure 2:
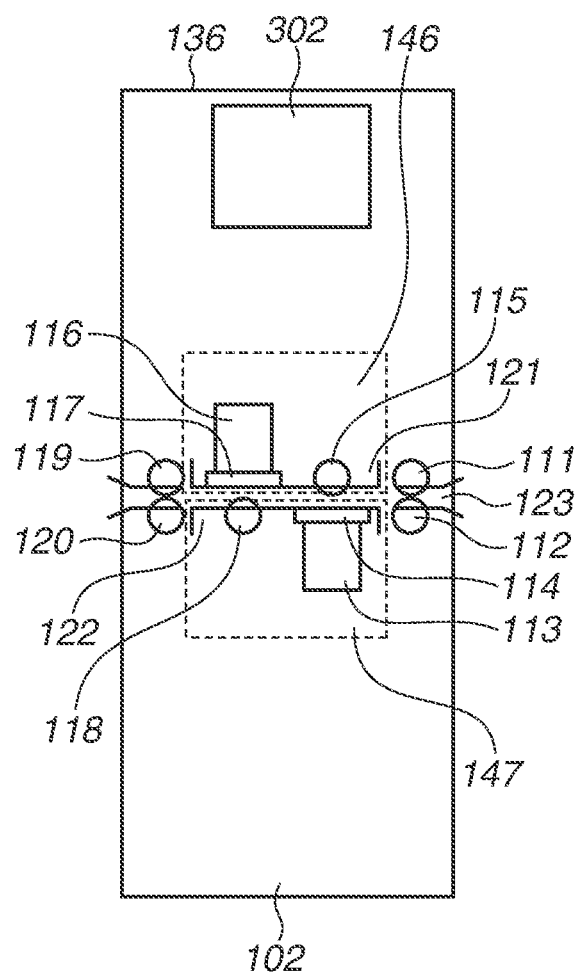
FIG. 2 is a cross-sectional view of an image reading apparatus.

FIG. 2 is a cross-sectional view of the image reading apparatus 102. The image reading apparatus 102 reads an image on a sheet formed by the printer 101. The image reading apparatus 102 includes a conveyance path 123 along which the sheet conveyed from the printer 101 is conveyed. The conveyance path 123 is a nearly horizontal conveyance path formed by an upper conveyance guide 121 and a lower conveyance guide 122. Inlet conveyance rollers 111 and 112 as first conveyance rollers and outlet conveyance rollers 119 and 120 as second conveyance rollers are arranged on the conveyance path 123. The inlet conveyance rollers 111 and 112 are rollers that receive the sheet discharged from the printer 101 upstream of the image reading apparatus 102. The outlet conveyance rollers 119 and 120 are rollers that discharge the sheet to the stacking apparatus 103 downstream of the image reading apparatus 102.

A first reading unit 113 and a second reading unit 116 are arranged in an image reading unit 147 of the image reading apparatus 102. The first reading unit 113 reads an image on the lower surface (a first surface) of the sheet, and the second reading unit 116 reads an image on the upper surface (a second surface) of the sheet. This configuration allows the image reading apparatus 102 to read the images on both surfaces of the sheet. The second reading unit 116 is at a position downstream of the first reading unit 113 in the conveyance direction of the conveyance path 123, and the reading position (a second reading position) of the second reading unit 116 is downstream of the reading position (a first reading position) of the first reading unit 113. The first reading unit 113 and the second reading unit 116 are, for example, contact image sensors (CIS) or charge coupled device (CCD) cameras.

The images read by the first reading unit 113 and the second reading unit 116 are transmitted as signals to an external PC 305. The external PC 305 compares the images read by the first reading unit 113 and the second reading unit 116 with the corresponding image data registered in advance and detects an image defect such as dirt on the sheet. This manner allows the external PC 305, which is a determination unit, to determine whether the sheet on which the image is formed by the printer 101 is normal.

According to the present exemplary embodiment, the external PC 305 is provided outside the image reading apparatus 102, but may be provided integrally with the image reading apparatus 102 or the printer 101.

A glass 114, which is a first transparent member and forms a part of the conveyance path 123, is incorporated in the lower conveyance guide 122. The glass 114 faces the lower surface of the sheet being conveyed. The image on the lower surface of the sheet conveyed along the conveyance path 123 is read by the first reading unit 113 through the glass 114.

A backing roller 115 is arranged at a position opposed to the glass 114 of the conveyance path 123. The backing roller 115 is an example of a first opposing roller according to the present exemplary embodiment. The backing roller 115 is arranged at the reading position of the first reading unit 113 in the conveyance direction. The backing roller 115 is supported by the upper conveyance guide 121. The backing roller 115 can be rotationally driven by a driving gear 351 connected to a driving motor 350, which is a first motor (refer to FIG. 4 described below). The driving gear 351 transmits driving force from the driving motor 350 to the backing roller 115. The pair of driving motor 350 and the driving gear 351 are an example of a driving unit according to the present exemplary embodiment.

A glass 117, which is a second transparent member and forms a part of the conveyance path 123, is incorporated in the upper conveyance guide 121. The glass 117 faces the upper surface of the sheet being conveyed. The image on the upper surface of the sheet conveyed along the conveyance path 123 is read by the second reading unit 116 through the glass 117.

A backing roller 118 is arranged at a position opposed to the glass 117 of the conveyance path 123. The backing roller 118 is an example of a second opposing roller according to the present exemplary embodiment. The backing roller 118 is arranged at the reading position of the second reading unit 116 in the conveyance direction. The backing roller 118 is supported by the lower conveyance guide 122. The backing roller 118 can be rotationally driven by a second motor, which is not illustrated, in the same manner as the backing roller 115. The pressure with which the backing rollers 115 and 118 press the sheet is smaller than the nip pressure between the outlet conveyance rollers 119 and 120.

The sheet of which the images are read by the first reading unit 113 and the second reading unit 116 is conveyed from the image reading apparatus 102 to the stacking apparatus 103 by the outlet conveyance rollers 119 and 120. A control apparatus 302, which is a control unit, controls the driving of each roller in the image reading apparatus 102, and controls the first reading unit 113, and the second reading unit 116. Each roller, the first reading unit 113, the second reading unit 116, and the control apparatus 302 described above are housed inside a housing 136 of the image reading apparatus 102.

[Configuration of Stacking Apparatus]

Figure 3:
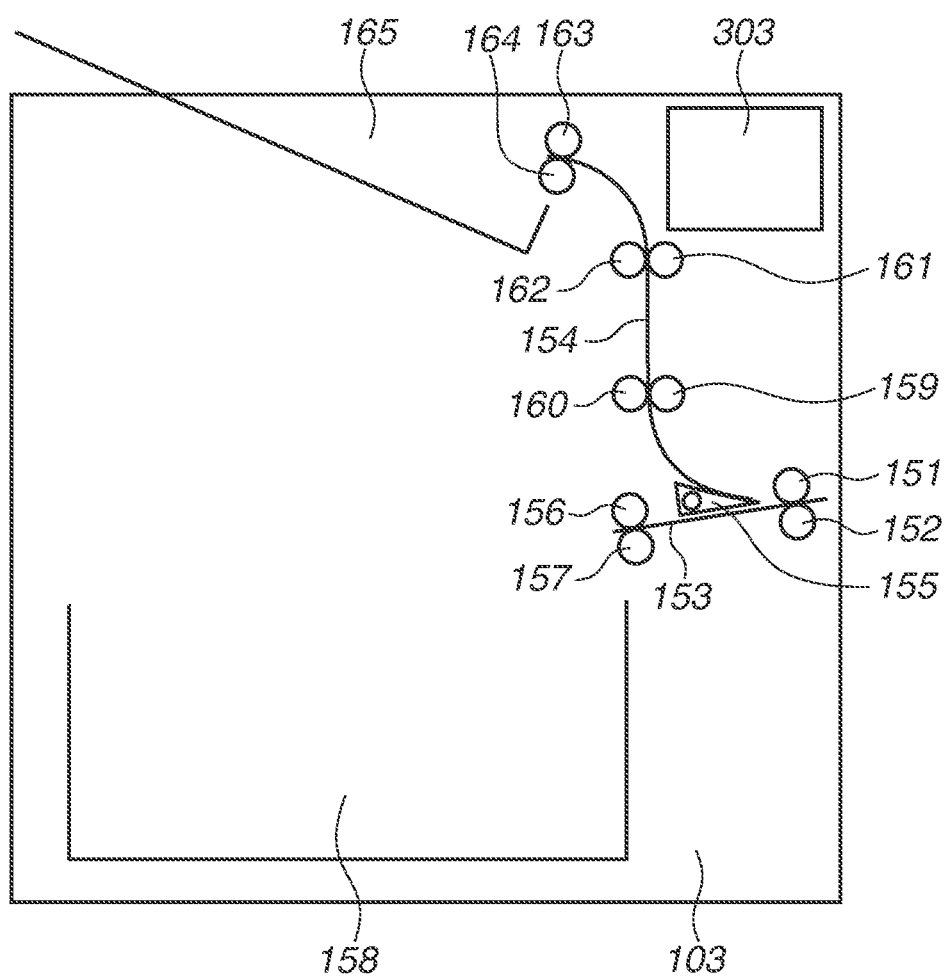
FIG. 3 is a cross-sectional view of a stacking apparatus.

FIG. 3 is a cross-sectional view of the stacking apparatus 103. Sheets conveyed from the image reading apparatus 102 to the stacking apparatus 103 are stacked in a first stacking unit 158 or a second stacking unit 165. A flapper 155 switches between conveyance paths 153 and 154 to and along which the sheet is to be conveyed.

If the sheet is discharged to the first stacking unit 158, the sheet is conveyed along the conveyance path 153 by conveyance rollers 151 and 152 and conveyance rollers 156 and 157. If the sheet is discharged to the second stacking unit 165, the sheet is guided to the conveyance path 154 by the flapper 155 and is conveyed by conveyance rollers 159 and 160, conveyance rollers 161 and 162, and conveyance rollers 163 and 164. A control unit 303 controls the driving of each conveyance roller and the flapper 155.

As described above, the image forming system 100 can inspect the image read by the image reading apparatus 102. The control unit 303 controls each conveyance roller and the flapper 155 to discharge the sheet determined to be normal by the external PC 305 to the first stacking unit 158 and to discharge the sheet determined to be abnormal by the external PC 305 to the second stacking unit 165.

[Description of Image Reading Unit]

Figure 4:
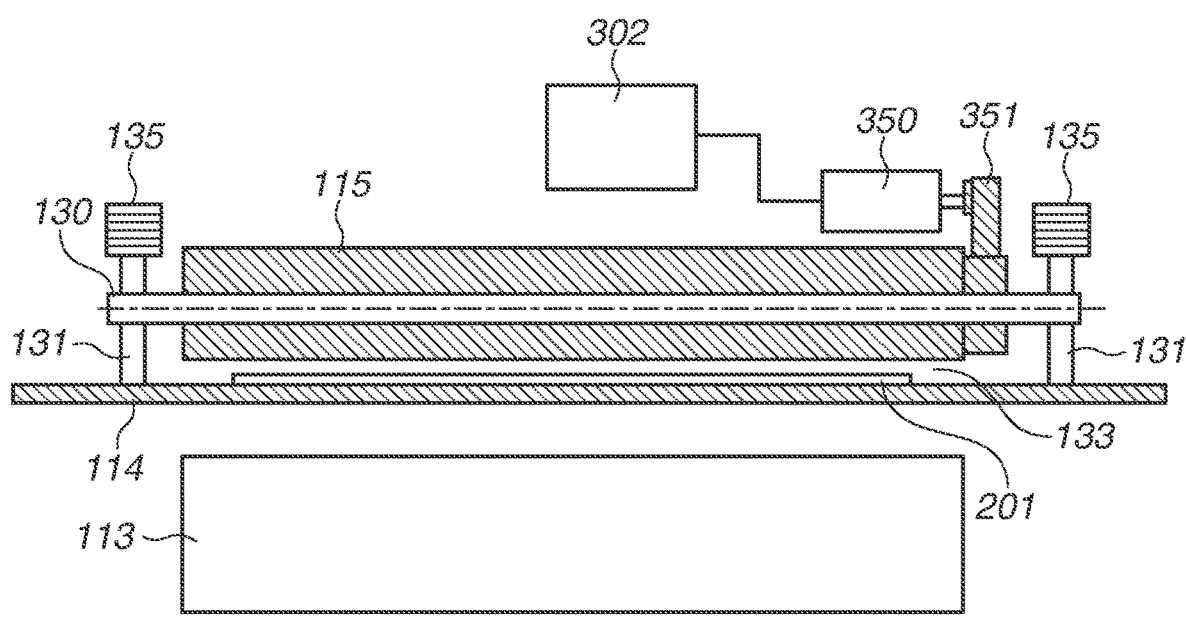
FIG. 4 is a side view of the image reading apparatus at a reading position.

FIG. 4 is a side view of the first reading unit 113 and the backing roller 115 with a sheet 201 having a thickness t of less than 0.4 millimeter [mm] conveyed therein. An example of the sheet 201 having a thickness t of less than 0.4 [mm] is plain paper generally used for printing.

As illustrated in FIG. 4, abutting units 131 that abut on the glass 114 are arranged at both ends of the backing roller 115 in the width direction of the backing roller 115 (perpendicular to the conveyance direction). The backing roller 115 is movable in a direction separating from the glass 114 (upward in FIG. 4) and is urged toward the glass 114 by springs 135, which are an urging member. At this time, the abutting units 131, which are a gap forming unit, abut on the glass 114, forming a gap 133 between the glass 114 and the backing roller 115.

According to the present exemplary embodiment, the gap 133 is approximately 0.4 [mm], and the backing roller 115 prevents the sheet 201 being conveyed from floating above the glass 114 by 0.4 [mm] or more. Since the thickness of the sheet 201 is less than 0.4 [mm], the sheet 201 does not lift the backing roller 115. Thus, when the sheet 201 is being conveyed, the abutting unit 131 remains abutting on the glass 114. The second reading unit 116 downstream is also configured with a mechanism similar to the first reading unit 113 and the backing roller 115, except that it is disposed upside down.

Figure 5:
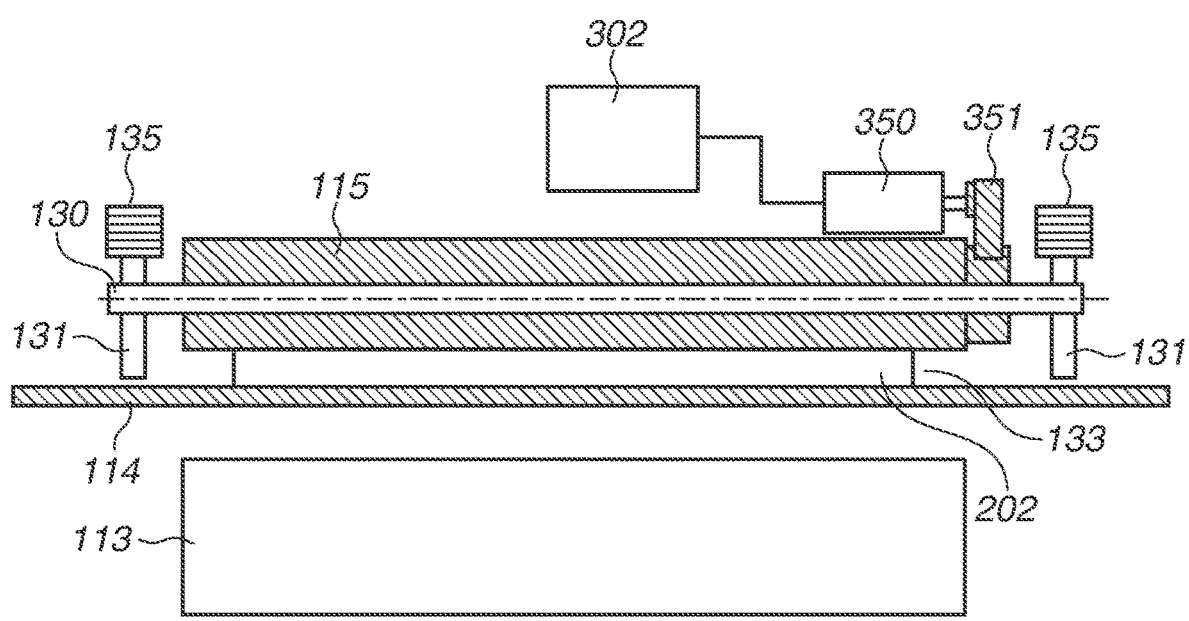
FIG. 5 is a side view of the image reading apparatus at the reading position.

FIG. 5 is a side view of the first reading unit 113 and the backing roller 115 with a sheet (super-thick paper) 202 having a thickness t of 0.4 [mm] or more conveyed therein.

As illustrated in FIG. 5, the thickness of the sheet 202 is greater than the original gap 133, so that the sheet 202 lifts the backing roller 115 against the urging force of the springs 135, and the abutting units 131 are lifted up from the glass 114. At this time, the lower surface of the sheet 202 is in close contact with the glass 114, so that the first reading unit 113 can correctly read the image on the sheet 202.

If the gap 133 is set wider, it is not possible to regulate floating of the sheet 201 having a thickness t of less than 0.4 [mm] in the depth direction (a direction perpendicular to the surface of the glass 114), which may result in a reading failure. According to the present exemplary embodiment, the gap 133 is set at 0.4 [mm], which is a range in which the first reading unit 113 and the second reading unit 116 can read the image correctly. If the sheet 202 having a thickness t of 0.4 [mm] or more, the backing roller 115 is pushed and lifted by the sheet being conveyed, causing the gap 133 to be changed. Thus, the image reading apparatus 102 can read images on sheets of various thicknesses. According to the present exemplary embodiment, the gap 133 is 0.4 [mm], but the gap between the glass 114 and the backing roller 115 is not limited to this value and is desirable to be set appropriately based on the performance of the reading units.

Figure 6:
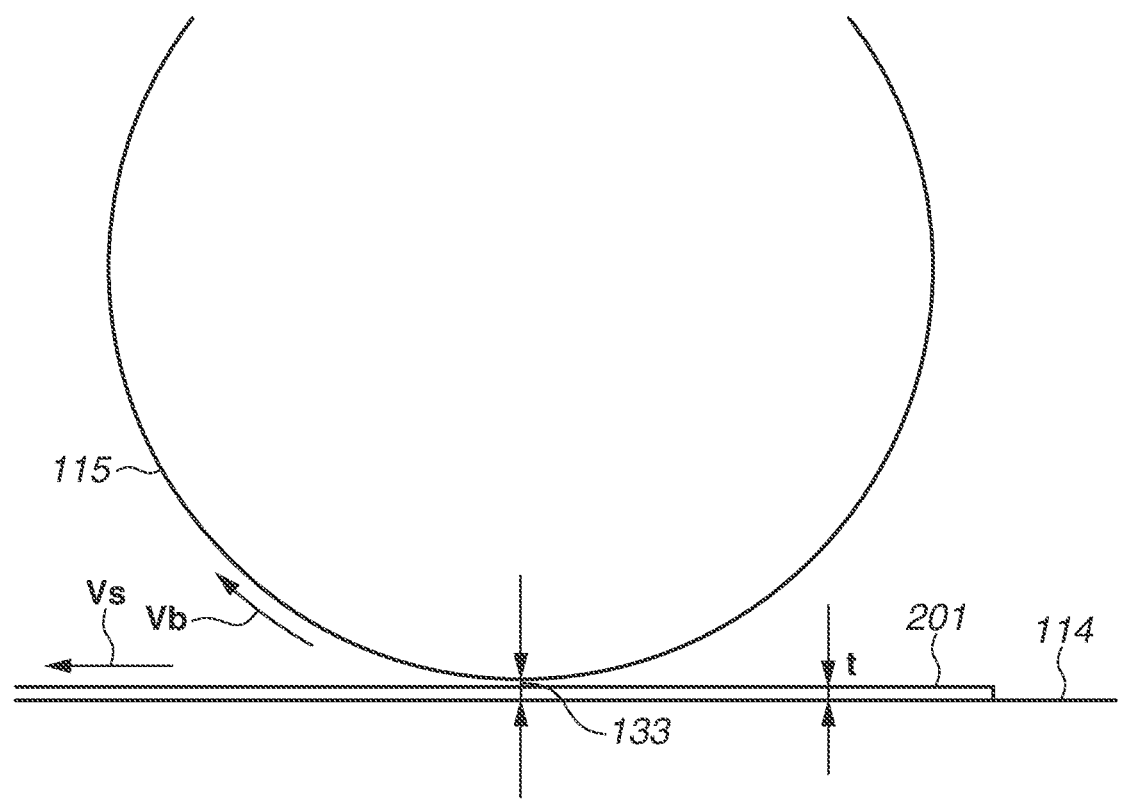
FIG. 6 illustrates a gap between a backing roller and a glass.

FIG. 6 is an enlarged view of the backing roller 115 with the sheet 201 (a second sheet) having a thickness t of less than 0.4 [mm] conveyed therein. The sheet 201 is conveyed at a movement speed (a conveyance speed) Vs. The outlet conveyance rollers 119 and 120 are provided at positions at which the outlet conveyance rollers 119 and 120 are in contact with the sheet while the second reading unit 116 reads the image on the sheet. Thus, the conveyance speed Vs is almost the same as the circumferential speed of the outlet conveyance rollers 119 and 120 located downstream of the first reading unit 113. Then, while the outlet conveyance rollers 119 and 120 convey the sheet, the trailing edge of the sheet passes over the reading position of the first reading unit 113 (between the glass 114 and the backing roller 115). According to the present exemplary embodiment, a circumferential speed is the speed of the outer surface of a roller in rotation.

The backing roller 115 rotates at a circumferential speed Vb. According to the present exemplary embodiment, the control apparatus 302 controls the driving motor 350 in such a manner that the circumferential speed Vb of the backing roller 115 is faster than the conveyance speed Vs. In other words, the circumferential speed Vb of the backing roller 115 is set to a value faster than the circumferential speed of the outlet conveyance rollers 119 and 120. When the sheet 201 is conveyed, the backing roller 115 does not move in the direction separating from the glass 114.

As illustrated in FIG. 6, the backing roller 115 is driven to rotate at the circumferential speed Vb, and when the sheet 201 having a thickness t of less than 0.4 [mm] is conveyed, there is a gap between the backing roller 115 and the sheet 201. Thus, the sheet conveyance force applied to the sheet 201 by the backing roller 115 is extremely small. Thus, the speed difference between the conveyance speed Vs and the circumferential speed Vb of the backing roller 115 has almost no effect on the image reading of the sheet 201.

Figure 7:
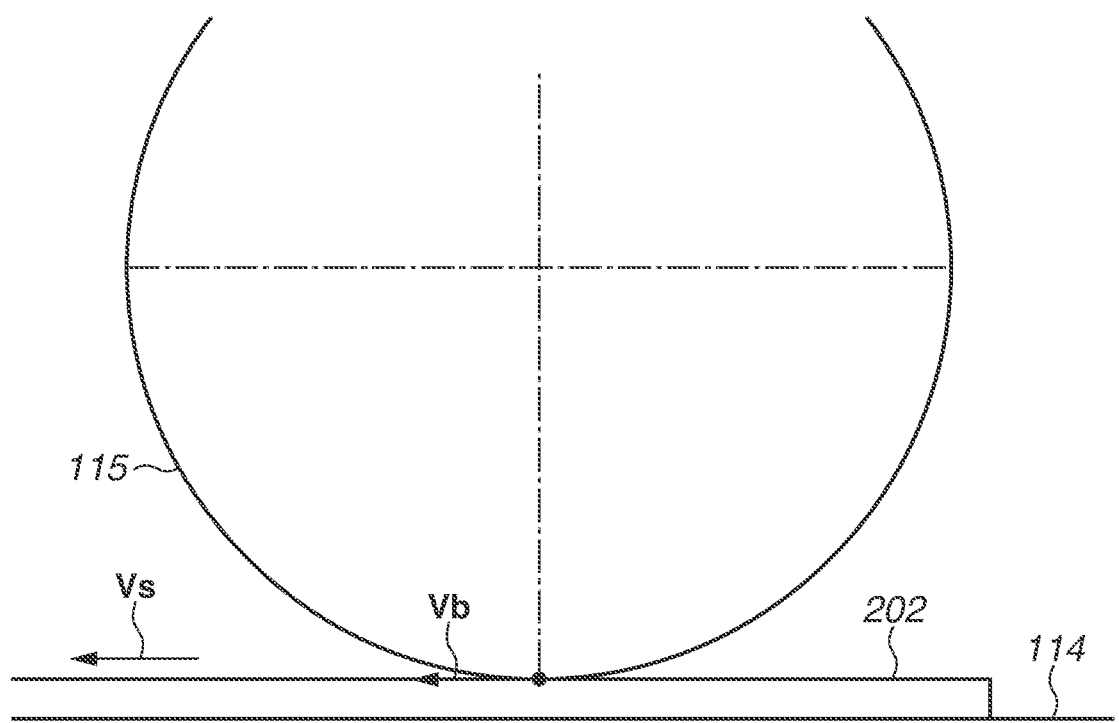
FIG. 7 illustrates the backing roller in conveying thick paper.

FIG. 7 is an enlarged view of the backing roller 115 with the sheet 202 (a first sheet) having a thickness t of 0.4 [mm] or more conveyed therein. As illustrated in FIG. 7, when the sheet 202 is conveyed, the backing roller 115 is pushed by the sheet 202 and is moved in the direction separating from the glass 114. At this time, the backing roller 115 is in contact with the sheet 202. However, the pressure with which the backing roller 115 presses the sheet is set smaller than the nip pressure between the outlet conveyance rollers 119 and 120, so that the speed difference between the conveyance speed Vs and the circumferential speed Vb of the backing roller 115 has almost no effect on the image reading of the sheet 202. The sheet 202 having a thickness t of 0.4 [mm] or more has higher rigidity than the sheet 201 having a thickness t of less than 0.4 [mm] and is hard to deform, and the backing roller 115 slips on the sheet 202. This reduces the effect on the image reading of the sheet 202 due to the speed difference between the conveyance speed Vs and the circumferential speed Vb of the backing roller 115. The pressure with which the backing roller 115 presses the sheet is determined by the springs 135.

Figure 8:
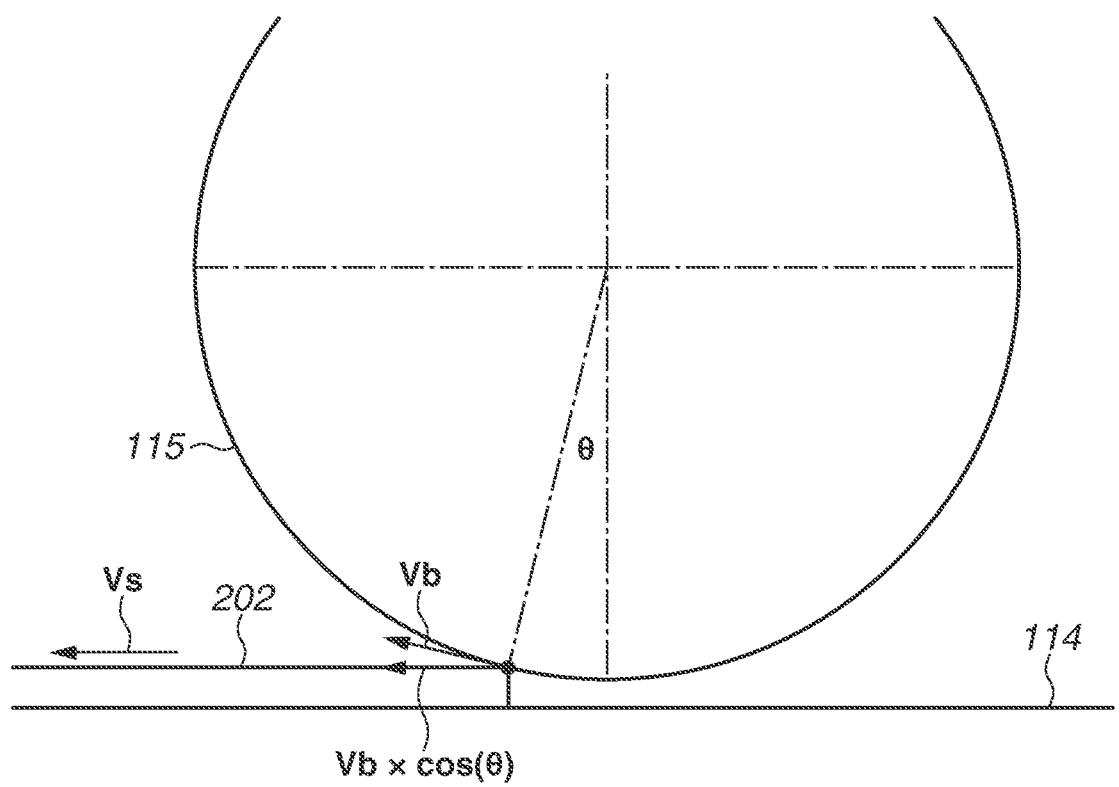
FIG. 8 illustrates a force when the thick paper passes through the backing roller.

FIG. 8 is an enlarged view of the backing roller 115 when the trailing edge of the sheet 202 having a thickness t of 0.4 [mm] or more exits the backing roller 115. As illustrated in FIG. 8, when the trailing edge of the sheet 202 exits the backing roller 115, the trailing edge of the sheet 202 is advancing by an angle $\theta$ from immediately under the rotation center of the backing roller 115 in the conveyance direction. At this time, the component in the conveyance direction of the circumferential speed Vb of the backing roller 115 at a point where the sheet 202 is in contact with the backing roller 115 is expressed as $Vb \times \cos(\theta)$.

Supposing the circumferential speed Vb of the backing roller 115 is set to the same speed as the conveyance speed Vs (Vb=Vs), the component $Vb \times \cos(\theta)$ is smaller than the conveyance speed Vs ($Vb \times \cos(\theta) < Vs$). As a result, the sheet is pulled by the outlet conveyance rollers 119 and 120 and the backing roller 115, so that a shock that occurs when the sheet 202 is released from the pull out of contact with the backing roller 115 could lead to an image defect in the second reading unit 116.

On the other hand, according to the present exemplary embodiment, the circumferential speed Vb of the backing roller 115 is set to the value faster than the conveyance speed Vs. More specifically, the circumferential speed Vb of the backing roller 115 is set to a value satisfying $Vs < Vb \times \cos(\theta)$. Thus, the sheet is not pulled by the outlet conveyance rollers 119 and 120 and the backing roller 115. In other words, the shock is prevented, which prevents the image defect in the second reading unit 116 downstream from occurring.

According to the present exemplary embodiment, as an example, the conveyance speed Vs is 100 [mm/S], the circumferential speed Vb of the backing roller 115 is 103 [mm/S], and the outer diameter of the backing roller 115 is 20 [mm]. If the thickness t of the sheet 202 is 0.5 [mm], the angle $\theta$ is about 8.1°, and the component $Vb \times \cos(\theta) = 101.97$ [mm/S]. In other words, the circumferential speed Vb of the backing roller 115 has a value satisfying $Vs < Vb \times \cos(\theta)$.

[Description of Disturbance in Image Scaling Ratio]

Figure 9A:
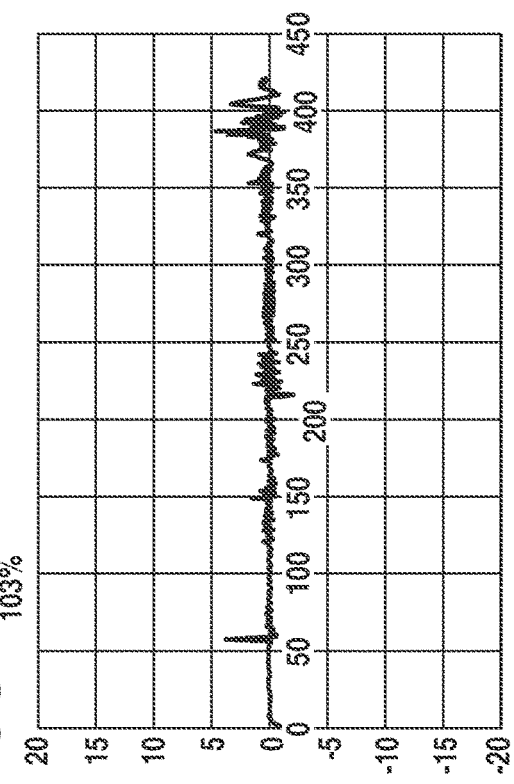
FIGS. 9A to 9D illustrate image scaling ratios in the sub scanning direction.
Figure 9B:
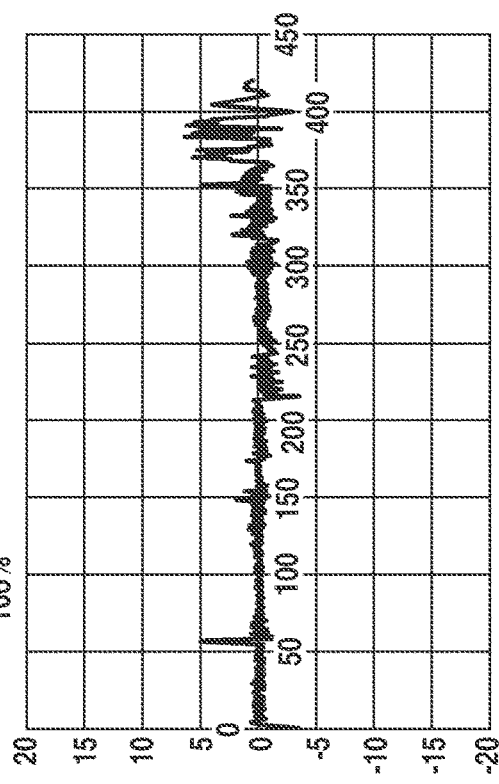
Figure 9C:
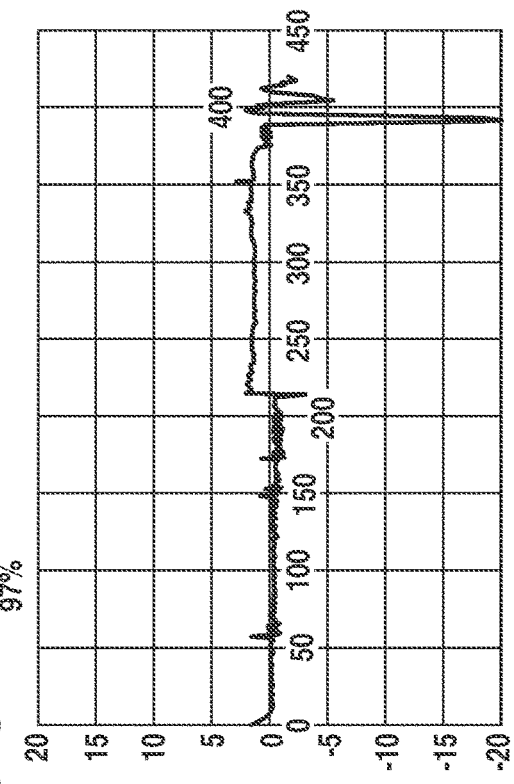

FIGS. 9A to 9D are graphs indicating image scaling ratios in the sub scanning direction of image reading when the second reading unit 116 downstream reads an image on a sheet (super-thick paper) having a thickness t of about 0.5 [mm]. In FIGS. 9A to 9D, the vertical axes and the horizontal axes of the graphs respectively indicate image scaling ratios and sheet conveyance distances, respectively. The image scaling ratios are ratios of enlargement and reduction of a read image at a predetermined pitch in the conveyance direction. It is desirable that the image scaling ratio is stable near 0%. In FIGS. 9A to 9D, ratios of the circumferential speed Vb of the backing roller 115 to the conveyance speed Vs are respectively different. FIG. 9A is a graph when the circumferential speed Vb of the backing roller 115 is 97% of (3% slower than) the conveyance speed Vs. FIG. 9B is a graph when the circumferential speed Vb of the backing roller 115 is 100% of (the same speed as) the conveyance speed Vs. FIG. 9C is a graph when the circumferential speed Vb of the backing roller 115 is 103% of (3% faster than) the conveyance speed Vs.

Figure 9D:
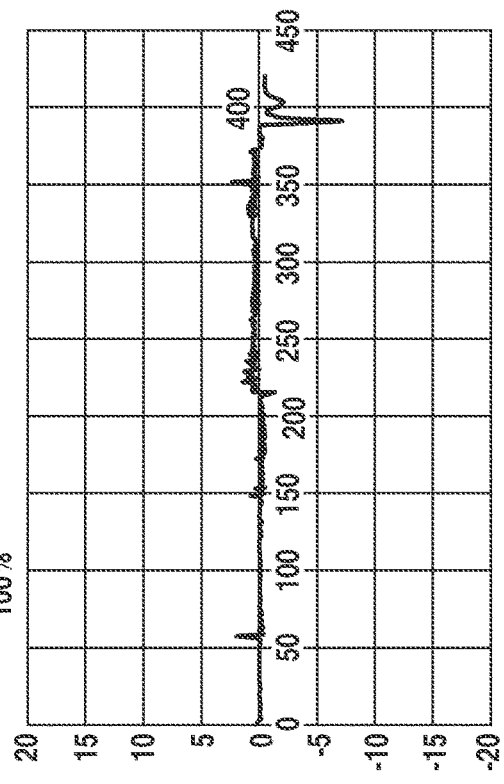

FIG. 9D is a graph when the circumferential speed Vb of the backing roller 115 is 106% of (6% faster than) the conveyance speed Vs. In other words, FIGS. 9A and 9B are the graphs when the circumferential speed Vb of the backing roller 115 is set to the circumferential speed of the outlet conveyance rollers 119 and 120 or less. Meanwhile, FIGS. 9C and 9D are the graphs when the circumferential speed Vb of the backing roller 115 is set to values greater than the circumferential speed of the outlet conveyance rollers 119 and 120.

In FIGS. 9A to 9D, the timing when the trailing edge of the sheet exits from the backing roller 115 corresponds to a value near 400 on the horizontal axis. At the timing when the trailing edge of the sheet exits from the backing roller 115, the image scaling ratio of the read image of the second reading unit 116 can be disturbed as the speed of the sheet temporarily changes.

As illustrated in FIG. 9A, when the circumferential speed Vb of the backing roller 115 is 97% of (3% slower than) the conveyance speed Vs, the image scaling ratio is greatly disturbed, causing a reading failure to occur. As illustrated in FIG. 9B, even when the circumferential speed Vb of the backing roller 115 is 100% of (the same speed as) the conveyance speed Vs, the image scaling ratio is slightly disturbed. As illustrated in FIG. 9C, when the circumferential speed Vb of the backing roller 115 is 103% of (3% faster than) the conveyance speed Vs, the disturbance on the image scaling ratio is small, and positive and negative waveforms cancel each other out. As illustrated in FIG. 9D, when the circumferential speed Vb of the backing roller 115 is 106% of (6% faster than) the conveyance speed Vs, the image scaling ratio is slightly disturbed.

As described above, the circumferential speed Vb of the backing roller 115 is set to a value greater than the circumferential speed of the outlet conveyance rollers 119 and 120, so that the image scaling ratio is stabilized, reducing reading failures. Further, it is desirable that the circumferential speed Vb of the backing roller 115 is 101% or more and 104% or less of the circumferential speed of the outlet conveyance rollers 119 and 120.

[Description of Flowchart]

As illustrated in FIG. 8, when the thickness t of the sheet is greater than the gap 133, the backing roller 115 is pushed and lifted up by the sheet. Thus, when the thickness t of a sheet is a predetermined thickness or more, the circumferential speed Vb of the backing roller 115 may be set to a value greater than the circumferential speed of the outlet conveyance rollers 119 and 120.

FIG. 10 is a flowchart illustrating a reading operation corresponding to a paper type performed by the control apparatus 302. In the image reading apparatus 102, the circumferential speed Vb of the backing roller 115 can be set to a value greater than the circumferential speed of the outlet conveyance rollers 119 and 120 regardless of the paper type, but when the frequency of opportunities of conveying super-thick paper is small, the circumferential speed Vb of the backing roller 115 can be changed based on the paper type.

The control apparatus 302 starts processing in the flowchart illustrated in FIG. 10 when a sheet is conveyed from the printer 101 to the image reading apparatus 102. As illustrated in FIG. 10, in step S101, the control apparatus 302 acquires information about the sheet to be conveyed. At this time, the control apparatus 302 functions as an acquisition unit and refers to the information about the sheet input by a user using the operation unit 21. The information about the sheet input by the user using the operation unit 21 is stored in the control unit 301.

Next, in step S102, the control apparatus 302 determines whether the thickness t of the sheet is a predetermined thickness or greater based on the information about the sheet acquired in step S101. According to the present exemplary embodiment, the predetermined thickness is set to 0.4 [mm], but may be appropriately changed based on the width of the gap 133.

If the thickness t of the sheet is the predetermined thickness or greater (YES in step S102), in step S103, the control apparatus 302 performs a high-speed backing roller mode. The high-speed backing roller mode is a mode for controlling the driving motor 350 so that the circumferential speed Vb of the backing roller 115 is greater than the circumferential speed of the outlet conveyance rollers 119 and 120. More specifically, in the high-speed backing roller mode, the control apparatus 302 sets the circumferential speed Vb of the backing roller 115 between 101% and 104%, inclusive, of the circumferential speed of the outlet conveyance rollers 119 and 120. The circumferential speed Vb of the backing roller 115 at this time is defined as a first circumferential speed.

On the other hand, if the thickness t of the sheet is not the predetermined thickness or more (NO in step S102), in step S104, the control apparatus 302 performs a normal-speed backing roller mode. The normal-speed backing roller mode is a mode for controlling the driving motor 350 so that the circumferential speed Vb of the backing roller 115 is equivalent to the circumferential speed of the outlet conveyance rollers 119 and 120. The circumferential speed Vb of the backing roller 115 at this time is defined as a second circumferential speed. The second circumferential speed is slower than the first circumferential speed.

Then, in step S105, the control apparatus 302 performs image reading with the first reading unit 113 and the second reading unit 116 while conveying the sheet in the high-speed backing roller mode or the normal-speed backing roller mode. After the image reading is completed, the control apparatus 302 terminates the processing in the flowchart.

By the above-described processing in the flowchart, the control apparatus 302 performs the high-speed backing roller mode if the thickness of the sheet is a first thickness greater than or equal to the predetermined thickness, and performs the normal-speed backing roller mode if the thickness of the sheet is a second thickness less than the predetermined thickness.

In the processing in the flowchart in FIG. 10, the control apparatus 302 switches between the high-speed backing roller mode and the normal-speed backing roller mode based on the thickness t of the sheet. However, the control apparatus 302 can switch between the high-speed backing roller mode and the normal-speed backing roller mode based on the basis weight of the sheet. Specifically, the control apparatus 302 performs the high-speed backing roller mode if the basis weight of the sheet is a first basis weight greater than or equal to a predetermined basis weight, and performs the normal-speed backing roller mode if the basis weight of the sheet is a second basis weight less than the predetermined basis weight.

The control apparatus 302 can switch between the high-speed backing roller mode and the normal-speed backing roller mode based on whether the print job specifies duplex printing. Specifically, the control apparatus 302 performs the high-speed backing roller mode if the print job specifies duplex printing, and performs the normal-speed backing roller mode if the print job specifies simplex printing.

The above-described control enables the control apparatus 302 to set the circumferential speed Vb of the backing roller 115 to an appropriate value corresponding to the type of the sheet to be conveyed.

The image reading apparatus 102 may include another conveyance roller pair between the first reading position and the second reading position in the conveyance direction. In this case, it is desirable that the circumferential speed Vb of the backing roller 115 is faster than the circumferential speed of the other conveyance roller pair.

The image forming system 100 according to the present exemplary embodiment is a system in which the printer 101, the image reading apparatus 102, and the stacking apparatus 103 are connected, but the configuration of the image forming system 100 is not limited to this one. The image forming system 100 may include another apparatus not illustrated. For example, an inserter for inserting sheets may be arranged between the printer 101 and the image reading apparatus 102. In this case, all apparatuses including the printer 101 arranged upstream of the image reading apparatus 102 are collectively referred to as an image forming apparatus. Further, for example, a cutting apparatus for cutting sheets may be arranged between the image reading apparatus 102 and the stacking apparatus 103. In this case, all apparatuses including the stacking apparatus 103 arranged downstream of the image reading apparatus 102 are collectively referred to as a discharge apparatus.

According to the present exemplary embodiment, the circumferential speed of the backing roller 118 can be the same as the conveyance speed. In other words, when the circumferential speeds of the backing roller 115 and the backing roller 118 are compared, the circumferential speed of the backing roller 115 may be set faster than the circumferential speed of the backing roller 118. In this case, the power consumption can be reduced as compared with a case where the backing roller 118 is rotated at high speed.

As described above, the image reading apparatus 102 according to the present exemplary embodiment sets the circumferential speed Vb of the backing roller 115 to be greater than the circumferential speed of the outlet conveyance rollers 119 and 120. This reduces a shock that will occur when a sheet is released from the pull between rollers, reducing an image defect in the second reading unit 116 downstream.

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described Embodiments and/or that includes one or more circuits (e.g., application specific integrated circuit (ASIC)) for performing the functions of one or more of the above-described Embodiments, and by a method performed by the computer of the system or apparatus by, for example, reading out and executing the computer executable instructions from the storage medium to perform the functions of one or more of the above-described Embodiments and/or controlling the one or more circuits to perform the functions of one or more of the above-described Embodiments. The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-190495, filed Nov. 24, 2021, which is hereby incorporated by reference herein in its entirety.

What is claimed is:

1. An image reading apparatus comprising:
a first conveyance roller configured to convey a sheet along a conveyance path;
a first transparent member configured to be arranged on the conveyance path and to be opposed to a first surface of the sheet conveyed by the first conveyance roller;
a first reading unit configured to read a first image on the first surface of the sheet through the first transparent member at a first reading position of the first reading unit;
a first opposing roller configured to be rotatable, to be opposed to the first transparent member at the first reading position of the first reading unit, and to be opposed to a second surface opposite to the first surface of the sheet;
a driving unit configured to drive the first opposing roller;
a second transparent member configured to be arranged on the conveyance path and to be opposed to the second surface of the sheet conveyed by the first conveyance roller;
a second reading unit configured to read a second image on the second surface of the sheet through the second transparent member at a second reading position of the second reading unit downstream of the first reading position in a conveyance direction of the first conveyance roller;
a second opposing roller configured to be rotatable, to be opposed to the second transparent member at the second reading position of the second reading unit, and to be opposed to the first surface of the sheet; and
a second conveyance roller configured to convey the sheet when the second reading unit reads the second image on the sheet,
wherein the second conveyance roller is arranged at a position where a trailing edge of the sheet passes through the first reading position while the second conveyance roller is conveying the sheet, and
wherein the driving unit drives the first opposing roller so that a circumferential speed of the first opposing roller is faster than a circumferential speed of the second conveyance roller.

2. The image reading apparatus according to claim 1, wherein the second conveyance roller is arranged downstream of the second opposing roller in the conveyance direction.

3. The image reading apparatus according to claim 1, wherein the circumferential speed of the first opposing roller is between 101% and 104%, inclusive, of the circumferential speed of the second conveyance roller.

4. The image reading apparatus according to claim 1, wherein the first opposing roller is movable in a direction separating from the first transparent member.

5. The image reading apparatus according to claim 4, further comprising:
a gap forming portion configured to form a gap between the first opposing roller and the first transparent member; and
an urging member configured to urge the first opposing roller toward the first transparent member.

6. The image reading apparatus according to claim 5, wherein, in a case where a first sheet having a thickness that is greater than a predetermined thickness is conveyed, the first opposing roller is pushed by the first sheet and is moved in a direction separating from the first transparent member, and, in a case where a second sheet having a thickness that is less than the predetermined thickness is conveyed, the first opposing roller is not moved in the direction separating from the first transparent member.

7. The image reading apparatus according to claim 1, wherein the driving unit includes a motor and a gear configured to transmit a driving force from the motor to the first opposing roller.

8. The image reading apparatus according to claim 1, further comprising a controller configured to acquire information regarding a thickness of the sheet, to control the driving unit so that the circumferential speed of the first opposing roller is a first circumferential speed faster than the circumferential speed of the second conveyance roller in a case where the acquired thickness of the sheet is a first thickness, and to control the driving unit so that the circumferential speed of the first opposing roller is a second circumferential speed slower than the first circumferential speed in a case where the acquired thickness of the sheet is a second thickness thinner than the first thickness.

9. The image reading apparatus according to claim 8, wherein the second circumferential speed is equivalent to the circumferential speed of the second conveyance roller.

10. The image reading apparatus according to claim 1, further comprising a controller configured to acquire information regarding a basis weight of the sheet, to control the driving unit so that the circumferential speed of the first opposing roller is a first circumferential speed faster than the circumferential speed of the second conveyance roller in a case where the acquired basis weight of the sheet is a first basis weight, and to control the driving unit so that the circumferential speed of the first opposing roller is a second circumferential speed slower than the first circumferential speed in a case where the acquired basis weight of the sheet is a second basis weight less than the first basis weight.

11. The image reading apparatus according to claim 10, wherein the second circumferential speed is equivalent to the circumferential speed of the second conveyance roller.

12. The image reading apparatus according to claim 1, wherein the first opposing roller is a backing roller arranged at a position directly above the first reading unit and the second opposing roller is a backing roller arranged remote from the first opposing roller in a horizontal direction and arranged at a position directly below the second reading unit.

13. An image forming system comprising:
    an image forming apparatus configured to form an image on a sheet; and
    an image reading apparatus configured to read the image on the sheet,
    wherein the image reading apparatus includes:
    a first conveyance roller configured to convey a sheet along a conveyance path,
    a first transparent member configured to be arranged on the conveyance path and to be opposed to a first surface of the sheet conveyed by the first conveyance roller,
    a first reading unit configured to read a first image on the first surface of the sheet through the first transparent member at a first reading position of the first reading unit,
    a first opposing roller configured to be rotatable, to be opposed to the first transparent member at the first reading position of the first reading unit, and to be opposed to a second surface opposite to the first surface of the sheet,
    a driving unit configured to drive the first opposing roller,
    a second transparent member configured to be arranged on the conveyance path and to be opposed to the second surface of the sheet conveyed by the first conveyance roller,
    a second reading unit configured to read a second image on the second surface of the sheet through the second transparent member at a second reading position of the second reading unit downstream of the first reading position in a conveyance direction of the first conveyance roller,
    a second opposing roller configured to be rotatable, to be opposed to the second transparent member at the second reading position of the second reading unit, and to be opposed to the first surface of the sheet, and
    a second conveyance roller configured to convey the sheet when the second reading unit reads the second image on the sheet,
    wherein the second conveyance roller is arranged at a position where a trailing edge of the sheet passes through the first reading position while the second conveyance roller is conveying the sheet, and
    wherein the driving unit drives the first opposing roller so that a circumferential speed of the first opposing roller is faster than a circumferential speed of the second conveyance roller.

14. The image forming system according to claim 13, further comprising a determination unit configured to compare image data about the image formed on the sheet by the image forming apparatus read by the image reading apparatus with image data registered in advance and to determine whether the image formed by the image forming apparatus on the sheet is normal.

15. The image forming system according to claim 13, further comprising a discharge apparatus that is arranged downstream of the image reading apparatus and is configured to discharge the sheet on which the image is formed by the image forming apparatus,
    wherein the first conveyance roller is an inlet roller configured to receive the sheet discharged by the image forming apparatus, and
    wherein the second conveyance roller is an outlet roller configured to discharge the sheet to the discharge apparatus.

* * * * *